United States Patent
Telang et al.

(10) Patent No.: US 9,820,085 B1
(45) Date of Patent: Nov. 14, 2017

(54) MULTI-DEVICE MANAGEMENT WITH SINGLE SUBSCRIPTION

(71) Applicant: QUALCOMM Incorporated, San Diego, CA (US)

(72) Inventors: Mahesh Devdatta Telang, San Diego, CA (US); Rakesh Maramreddy, San Diego, CA (US); Madhusudan Kinthada Venkata, San Diego, CA (US); Bhavik Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/200,662

(22) Filed: Jul. 1, 2016

(51) Int. Cl.
| | |
|---|---|
| *H04B 7/00* | (2006.01) |
| *H04W 4/00* | (2009.01) |
| *H04W 76/02* | (2009.01) |
| *H04W 8/00* | (2009.01) |
| *H04B 1/68* | (2006.01) |
| *H04W 88/02* | (2009.01) |

(52) U.S. Cl.
CPC .......... *H04W 4/008* (2013.01); *H04W 8/005* (2013.01); *H04W 76/023* (2013.01); *H04W 88/02* (2013.01)

(58) Field of Classification Search
CPC ... H04W 84/18; H04W 88/06; H04M 1/7253; H04B 1/3816
USPC ............................. 455/41.2, 410, 411, 558
See application file for complete search history.

(56) References Cited

U.S. PATENT DOCUMENTS

| | | | | |
|---|---|---|---|---|
| 2004/0042442 A1* | 3/2004 | Pecen | ................... | H04W 12/04 370/352 |
| 2014/0057600 A1* | 2/2014 | Dung | ...................... | H04W 8/02 455/411 |
| 2015/0019425 A1* | 1/2015 | Kumar | ................. | G06Q 20/382 705/44 |
| 2016/0261596 A1* | 9/2016 | Khello | ................. | H04W 12/08 |

FOREIGN PATENT DOCUMENTS

| | | |
|---|---|---|
| EP | 2986044 A1 | 2/2016 |
| EP | 3024261 A1 | 5/2016 |
| WO | WO 2012174722 A1 * 12/2012 | ............ H04W 8/183 |

OTHER PUBLICATIONS

International Search Report and Written Opinion—PCT/US2017/036087—ISA/EPO—dated Aug. 25, 2017.

* cited by examiner

Primary Examiner — Lee Nguyen
(74) Attorney, Agent, or Firm — Arent Fox, LLP

(57) ABSTRACT

The present disclosure provides techniques for assigning virtual international mobile subscriber identity (VIMSI) to the peripheral device associated with the user equipment (UE) based in part on the mobile device identification (ID) of the UE itself. As such, peripheral devices that are configured with dual radios (e.g., short range communication chips and cellular radio) do not require a separate subscriber information module (SIM) chip to establish cellular connectivity independent of the UE. Moreover, because the peripheral device is allocated a VIMSI based on the mobile ID of the UE, the peripheral devices also achieve an advantage of maintaining the same phone number as the UE.

30 Claims, 11 Drawing Sheets

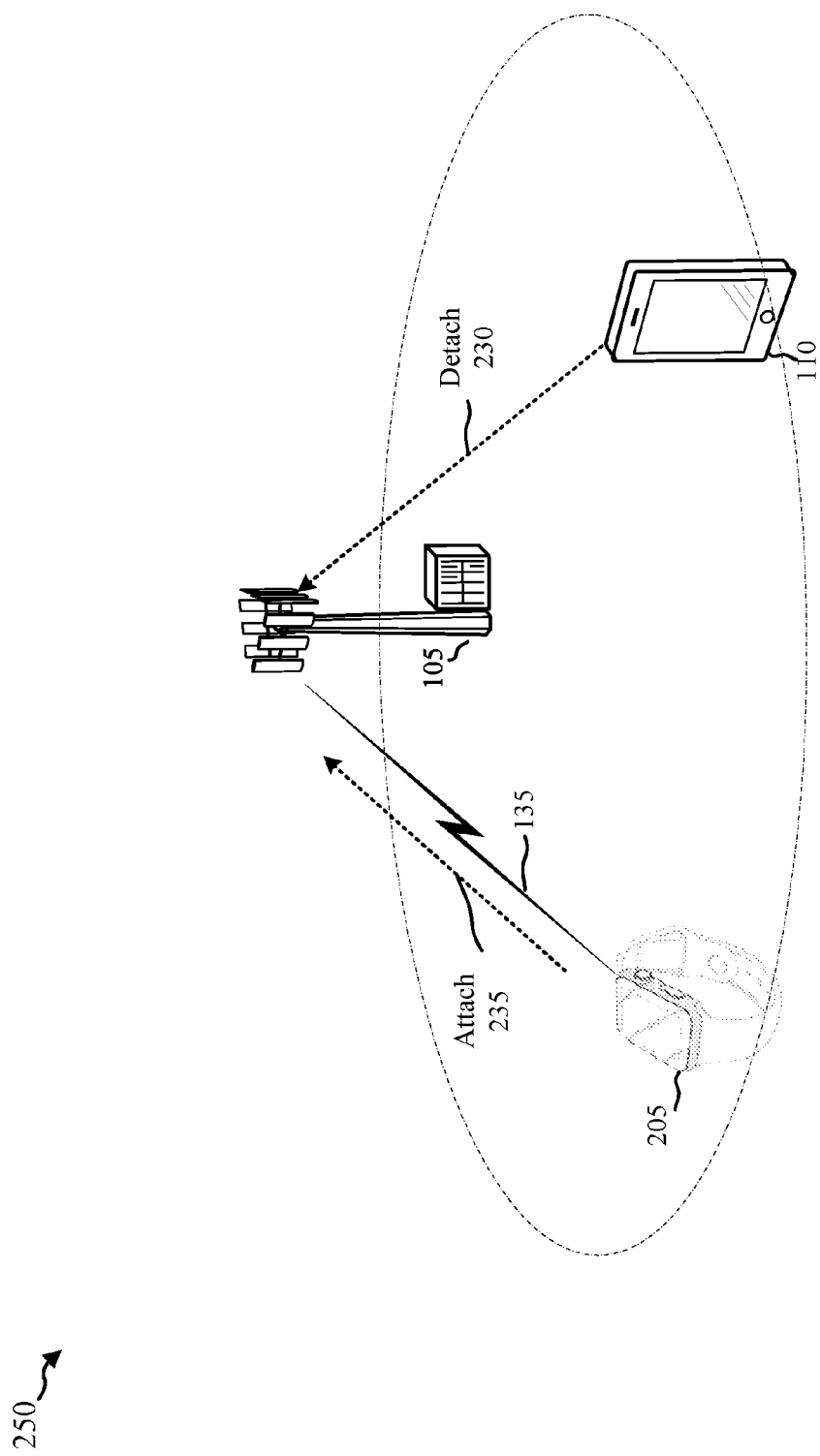

MULTI-DEVICE MANAGEMENT WITH SINGLE SUBSCRIPTION

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with one or more UEs on downlink channels (e.g., for transmissions from a base station to a UE) and uplink channels (e.g., for transmissions from a UE to a base station).

In recent years, advent of dynamically capable UEs has spurn growth for peripheral devices (e.g., smart watches, activity trackers, smart glasses, etc.) that expand the functionality and portability of the UEs. Such peripheral devices that are mostly "wearable devices" are generally equipped with short-range communication chips, such as Wi-Fi and Bluetooth modules. Accordingly, a peripheral device may communicate with the UE that is positioned only within a short range. For example, a user wearing a smartwatch may only utilize the full capabilities of the smartwatch (e.g., voice call, text messages, access internet, etc.) while the smartwatch and the UE are in close proximity to each other. However, conventional systems that are configured based on the short-range communication chips do not allow the user to continue using such network dependent functionalities when one device (e.g., UE or peripheral) is outside the coverage area of the short-range communication chip. One such instance may be if the user leaves his mobile device at home with only his wearable watch).

One solution that has been proposed to address the above problem includes configuring the peripheral device with both a short-range communication chip (e.g., Bluetooth module) as well as a wireless wide area network (WWAN) radio that may allow the peripheral device to communicate with the network independent of the UE. However, such configuration require the peripheral device to additionally include subscriber information module (SIM) chip such that the peripheral device may be authenticated by the network and assigned a unique phone number. Such a solution is not ideal because of the hardware considerations and user inconvenience. For example, first, the added hardware increases the size and costs of the peripheral device itself. Second, with a unique phone number for a peripheral device that is different from the phone number for the UE, a user may need to manage two separate subscriptions. Additionally, both incoming/outgoing calls would need to be made to/from a separate phone number. For example, a party attempting to reach the user would need to first call the mobile device, and then separately call the peripheral device (e.g., wearable watch). The inconvenience and costs associated with such solution far outweigh any benefit that may be gained.

SUMMARY

The present disclosure solves the above-identified problems by implementing techniques that assign virtual international mobile subscriber identity (VIMSI) to the one or more peripheral devices associated with the UE based in part on the mobile device identification (ID) of the UE itself. As such, peripheral devices that are configured with dual radios (e.g., short range communication chips and cellular radio) do not require a separate SIM chip. Because the peripheral device is allocated a VIMSI based on the mobile ID of the UE, the peripheral devices also achieve an advantage of maintaining the same phone number as their parent UE. Thus, the UE user only needs one subscription.

In accordance with an aspect of the present disclosure, a method for wireless communication implemented at a network entity is disclosed. The method may include receiving, at the network entity, a request from a user equipment (UE) to allocate a virtual subscriber information module (VSIM) profile for a peripheral device paired with the UE and determining a mobile device identification of the UE based in part on the request. Additionally or alternatively, the method may include allocating a virtual identifier to the peripheral device based on the mobile device identification of the UE and transmitting, from the network entity to the UE, the virtual identifier for the paired peripheral device.

In another aspect of the present disclosure, an apparatus for wireless communication implemented at a network entity is disclosed. The apparatus may include a processor and a memory coupled to the processor. In some examples, the memory may include instructions executable by the processor to receive, at the network entity, a request from a UE to allocate a VSIM profile for a peripheral device paired with the UE and determine a mobile device identification of the UE based in part on the request. Additionally or alternatively, the instructions may be further executable by the processor to allocate a virtual identifier to the peripheral device based on the mobile device identification of the UE and transmitting, from the network entity to the UE, the virtual identifier for the paired peripheral device.

In another aspect of the present disclosure, another apparatus for wireless communication implemented at a network entity is disclosed. The apparatus may include means for receiving, at the network entity, a request from a UE to allocate a VSIM profile for a peripheral device paired with the UE and means for determining a mobile device identification of the UE based in part on the request. Additionally or alternatively, the apparatus may further include means for allocate a virtual identifier to the peripheral device based on the mobile device identification of the UE and transmitting, from the network entity to the UE, the virtual identifier for the paired peripheral device.

In another aspect of the present disclosure, a computer readable medium for wireless communication implemented at a network entity is disclosed. The computer readable medium may include code for receiving, at the network entity, a request from a UE to allocate a VSIM profile for a peripheral device paired with the UE and code for determining a mobile device identification of the UE based in part on the request. Additionally or alternatively, the computer readable medium may further include code for allocate a virtual identifier to the peripheral device based on the mobile device identification of the UE and code for transmitting, from the network entity to the UE, the virtual identifier for the paired peripheral device.

In additional aspect of the present disclosure, a method for wireless communication implemented at a UE is disclosed. The method may include establishing communication between the UE and a peripheral device and receiving, at the UE, a request for a VSIM profile from the peripheral device. The method may further include initiating a data call with a network entity to request the VSIM profile for the peripheral device from the network entity and receiving, in response to the request, a virtual identifier from the network entity.

In another aspect of the present disclosure, a UE for wireless communication implemented is disclosed. The UE may include a processor and a memory coupled to the processor. In some examples, the memory may include instructions executable by the processor to establish communication between the UE and a peripheral device and receive, at the UE, a request for a VSIM profile from the peripheral device. The instructions may be further executable by the processor to initiate a data call with a network entity to request the VSIM profile for the peripheral device from the network entity and receiving, in response to the request, a virtual identifier from the network entity.

In another aspect of the present disclosure, another apparatus for wireless communication implemented at a UE is disclosed. The apparatus may include means for establishing communication between the UE and a peripheral device and means for receiving, at the UE, a request for a VSIM profile from the peripheral device. The apparatus may further include means for initiating a data call with a network entity to request the VSIM profile for the peripheral device from the network entity and means for receiving, in response to the request, a virtual identifier from the network entity.

In another aspect of the present disclosure, a computer readable medium for wireless communication implemented at a UE is disclosed. The computer readable medium include code for establishing communication between the UE and a peripheral device and code for receiving, at the UE, a request for a VSIM profile from the peripheral device. The computer readable medium may further include code for initiating a data call with a network entity to request the VSIM profile for the peripheral device from the network entity and cod for receiving, in response to the request, a virtual identifier from the network entity.

The above presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2B illustrates a schematic diagram of activating the one or more peripheral devices for cellular communication that is independent of UE involvement;

DETAILED DESCRIPTION

Figure 1:
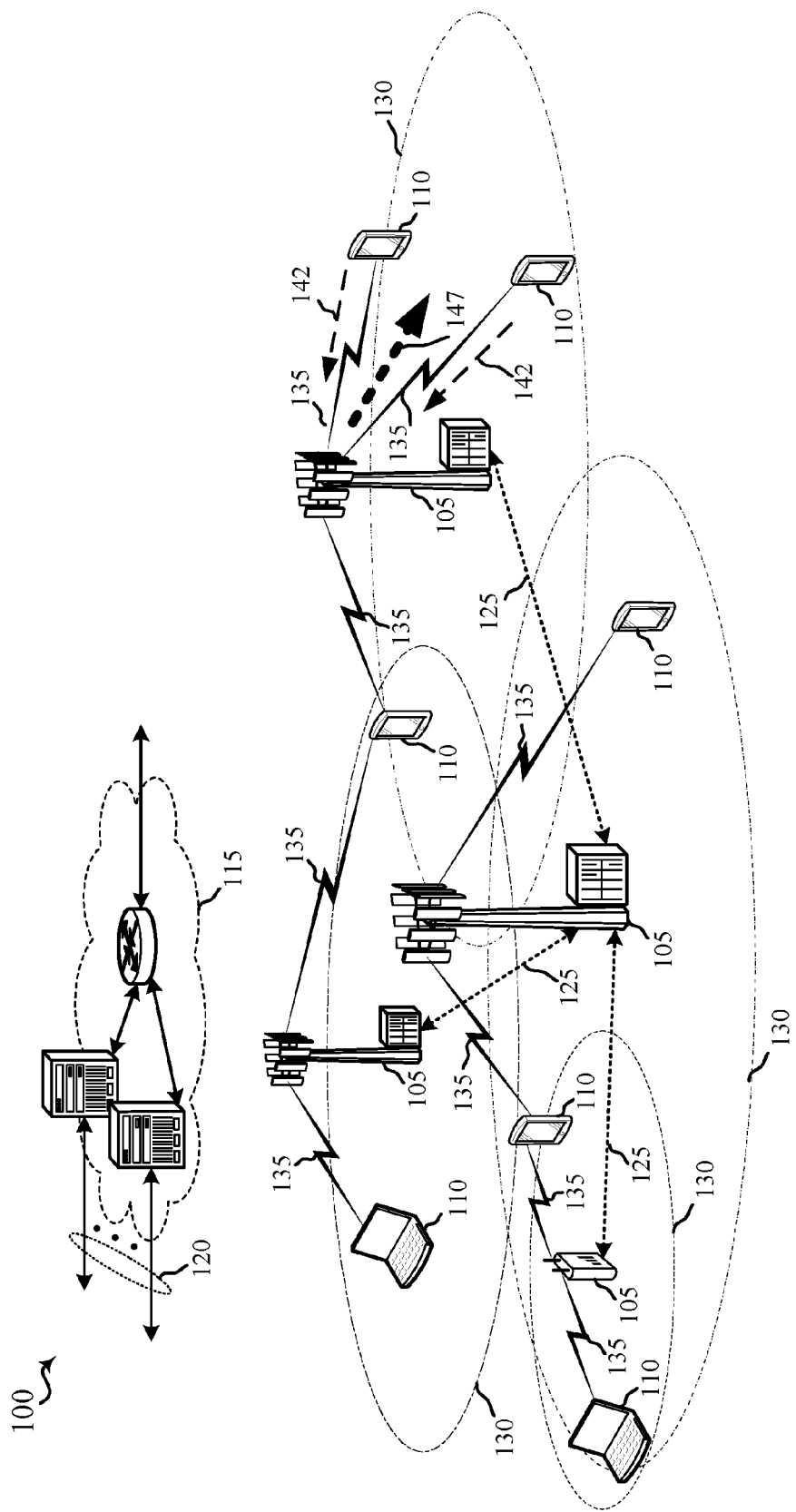
FIG. 1 is a schematic diagram of a wireless communication network in accordance with an exemplary embodiment of the present disclosure.

Various aspects will now be described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

As noted above, conventional systems that allow peripheral devices (e.g., smart watches, fitness trackers, smart cameras, etc.) network connectivity via both short-range communication (e.g., via the UE) and independent wireless wide area network (WWAN) communication suffer from the drawback of having added hardware requirements (e.g., subscriber information module (SIM) chip) and require the user to manage multiple phone numbers—one for the UE and one for each peripheral device. Particularly, as per the standards of the 3rd Generation Partnership Project (3GPP), each device (e.g., the UE and the peripheral device) with a separate SIM chip would be provided an International Mobile Subscriber Identity (IMSI), indicating the user's identification and the phone number (e.g., Mobile Station International ISDN Number (MSISDN)) that may be mapped in a one-to-one association. In other words, each device carried by the user (e.g., UE and each of the plurality of peripheral devices) would have their own phone number. Such implementation is neither convenient nor cost-effective.

Instead of requiring the peripheral device to maintain a separate SIM chip, aspects of the present disclosure solves the above-identified problem by assigning virtual identifier such as virtual international mobile subscriber identity (VIMSI) to the peripheral device associated with the UE based in part on the mobile device identification (ID) of the UE itself. As such, peripheral devices that are configured with dual radios (e.g., short range communication chips and cellular radio) do not require a separate SIM chip. Because each of the peripheral devices are allocated a VIMSI based on the mobile ID of the UE, the peripheral devices also achieve an advantage of maintaining the same MSISDN (e.g., phone number) as the UE.

Thus, based on the techniques described herein, peripheral device may dynamically switch between the short range communication and cellular communication based on one or more first and second triggers. For example, when the UE and the peripheral device are within a predetermined range, the cellular radio of the peripheral device may be deactivated such that the user may interface between the peripheral device and the UE using the short range communication chipset (e.g., Bluetooth or Wi-Fi). However, when the UE and the peripheral device are outside the predetermined range (e.g., when the user leaves the house with his peripheral while the mobile device remains at home), aspects of the present disclosure provide techniques to detach the UE from the network (in order to allow for reduced signaling overhead and power consumption) and activate the peripheral device connectivity that uses an assigned VIMSI profile to establish cellular communication with the network without the involvement of the UE. As such, both incoming/outgoing packets (voice and data) may be routed to and from the peripheral device directly without the involvement of the UE. Thus, in some examples, the one or more first triggers may include an indication that proximate distance between the UE and the peripheral exceeds a threshold (predetermined distance that may signify the effective range of the short-range communication chipset). Additionally or alternatively, the one or more second triggers may include an indication that proximate distance between the UE and the peripheral is less than the threshold.

Such system provides practical advantage because users in some situations may not prefer to carry their mobile devices (e.g., if the user is going for a run). In such situations, aspects of the present disclosure would allow the user to leave the UE at home and only take the peripheral device which would provide offer full network functionalities independent of the UE. In addition, as noted above, because features of the present disclosure do not require the peripheral to be configured with a separate SIM chip, the user is not inconvenienced with managing multiple phone numbers and the added cost and size of the peripheral itself.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a diversity antenna management component 140 configured to perform one or more techniques described herein. The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). In accordance with aspects of the present disclosure, a "network entity" that may be either the core network 115, a base station 105 or a combination thereof may be configured with allocating virtual identifier to one or more peripheral devices associated with the UEs 110 upon request of the UE 110. Thus, for the purposes of this disclosure, the term "network entity" may refer to one or more aspects of the network with which the UE corresponds with (e.g., base station 105 and core network 115). In one or more examples, the virtual identifier may be an virtual international mobile subscriber identity (VIMSI). The term "VIMSI" may be used interchangeably with virtual identifier or virtual SIM (VSIM) profile. In some examples, the network entity (e.g., core network 115 or the base station 105) may allocate each of the plurality of peripheral devices associated with the UE 110 a unique virtual identifier that is based in part on the mobile device identification of the UE (e.g., the international mobile subscriber identity (IMSI) of the UE 110). The network may also maintain a routing table of IP address/VIMSIs of the parent node (e.g., UE 110) and child node (e.g., peripheral device—see FIGS. 2A and 2B).

The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

Additionally or alternatively, the UE 110 may also be configured to be paired with one or more peripheral devices (e.g., smart watches, connected car, fitness tracker, smart cameras, music player, smart headphones, smart eyewear, etc.) via a short-range communication chipset (e.g., Bluetooth or Wi-Fi capabilities of both the UE 110 and the peripheral). It should be understood, that for purposes of this disclosure, it is contemplated that peripheral device may include any device that can communicate with the UE using a short-range communication chipset. As such, a user may interface with the features of the UE 110 via one or more peripheral devices. For example, a user may be able to receive and make phone calls or view/send text messages using the peripheral device (e.g., smart watch) without involvement of the UE 110 itself.

A UE 110 may be configured to establish one or more wireless communication links 135 with one or more base stations 105. The wireless communication links 135 shown in wireless communication network 100 may carry UL transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2A:
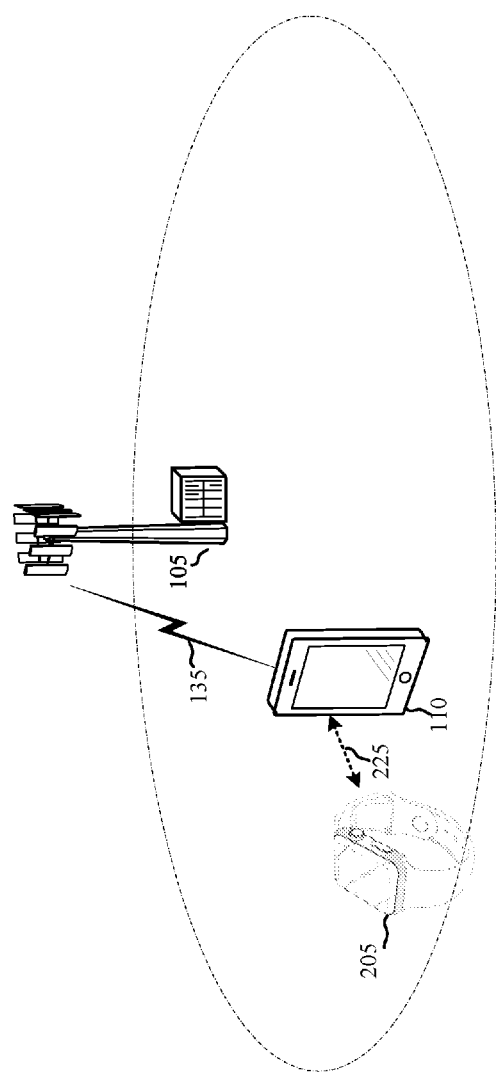
FIG. 2A illustrates another diagram of a wireless communication system illustrating techniques for allocating virtual identifiers for peripheral devices associated with the UE in accordance with aspects of the present disclosure.

FIG. 2A illustrates another diagram of a wireless communication system 200 illustrating techniques for allocating virtual identifiers for peripheral devices associated with the UE 110 in accordance with aspects of the present disclosure. The wireless communication system 200 may include a base station 105 and a UE 110 that may be similar to the base station 105 and the UE 110 described with reference to FIG. 1. The wireless communication system 200 additionally illustrates a peripheral device 205. Although only one peripheral device 205 is illustrated, it is contemplated that any number of peripheral devices 205 may be paired with the UE 110 concurrently.

In some examples, the peripheral device 205 may be configured with a cellular radio ("cellular modem") and a short-range communication chipset for establishing communication over non-cellular network (e.g., Bluetooth or Wi-Fi). In some configurations the UE 110 and the peripheral device 205 may operate in a parent-child (or "master-slave") configuration. As such, the peripheral devices may be provided with temporary or time controlled access rights or priority. In some examples, the priority based control may be used in situations where multiple peripheral devices 205 are active.

In accordance with various aspects of the present disclosure and to achieve the advantages set forth above, the one or more peripheral devices may be allocated a virtual SIM profile or VIMSI by the network entity (e.g., base station 105) that is based on the mobile device identification (IMSI) of the UE 110. Thus, the one or more peripheral devices 205 each may be identified by their respective unique virtual IMSIs.

As noted above, the core network 115 may provide user authentication, access authorization, tracking, internet protocol (IP) connectivity, and other access, routing, or mobility functions. Additionally, the base stations 105 may interface with the core network 115 through backhaul links 120 (e.g., S1, etc.). In some examples, the UE 110 may authenticate and attach with the network by transmitting an attach request to the network entity. In the wireless communication system 200, the network entity, following the attachment procedures may assign the UE 110 a unique MSISDN (e.g., phone number). In some examples, the UE 110 may also be paired 225 with the peripheral device 205 such that a user may control or interface with the UE 110 via the user interface of the peripheral device 205. The techniques for requesting and allocating the VIMSI will now be described.

Once the peripheral device 205 is paired 225 with the UE 110, the UE 110 may transmit to the peripheral device 205 indicated that a WWAN or cellular service may be available. In response, the peripheral device 205 may transmit, to the UE 110, a request for a VSIM profile that may be forwarded to the network entity (e.g., VSIM APN) during a data call. In some examples, the VSIM server may allocate a unique virtual identifier (VSIM profile or VIMSI) based on the mobile device ID of the UE 110. Thus, in some examples, the network entity 105 may maintain a routing table that correlates the mobile device identification with respective virtual identifier(s) of the peripheral device(s) 205.

In some aspects, following allocation of the VIMSI by the network entity, the VIMSI information may be transmitted to the UE 110 that may further forward the VSIM profile to the peripheral device 205 for storage. In some examples, both the UE 110 and the peripheral device 110 may maintain a virtual identifier peripheral database based on receiving the virtual identifier from the network entity 105. Although the one or more peripheral devices 205 may each be assigned a virtual identifier, the UE 110 and the one or more peripheral devices 205 may continue to interact via the non-cellular modem (e.g., Bluetooth) until detection of a trigger. For example, one or more trigger may include determination that the distance between the UE 110 and peripheral 205 exceeds a predetermined threshold. In other examples, the one or more trigger may be when the battery level of the UE 110 falls below a predetermined threshold. Thus, in order to conserve power, the UE 110 may dynamically determine to switch operations to the one or more peripherals. In other examples, the threshold may be identified when the UE 110 notifies the network entity 105 of the active peripheral devices. In some examples, the UE 110 may also provide the network entity 105 a priority list of peripheral device(s) 205. The priority list may identify an order in which the network entity should contact the peripheral devices 205 when a plurality of peripheral devices 205 are active. In some examples, the priority list may be set based on user preference of peripheral devices. In other examples, the priority list may be based on identification of most commonly used peripheral devices.

FIG. 2B illustrates a schematic diagram 250 of activating the one or more peripheral devices 205 for cellular communication that is independent of UE 110 involvement. As discussed above, once the one or more peripheral devices 205 are assigned their respective VSIM profiles or virtual identifiers, the UE 110 and the peripheral device 205 may continue to communicate via, for example, Bluetooth or Wi-Fi communication link 225. However, based on one or more triggers, the UE 110 may determine to activate the peripheral device 205 such that the network communications (e.g., voice and data communications) may be established directly between the peripheral device 205 and the UE 105 without UE 110 involvement. Such situations may arise, for example, when the user chooses to leave the UE 110 at home while carrying only the peripheral device(s) 205. In such situation, the UE 110 may transmit from the UE 110 to the network entity 105, a supplementary service message that identifies one or more active peripheral devices 205 associated with the UE 110. In some examples, the supplementary service message may identify when the peripheral devices 205 need to be activated or deactivated. Additionally or alternatively, the supplementary service message may be utilized to identify (or change) priorities of the peripheral devices 205 that the UE 110 prefers the network entity 105 contact in order of user preference indicated in the priority list.

Thus, in some examples, the UE 110 may determine that one or more triggers have been satisfied (e.g., that the UE 110 and the peripheral are no longer in predetermined proximity of one another). Based on the determination, the UE 110 may transmit a detach message 230 to the network entity 105 indicating an intent to detach from the network. In some examples, the UE 110 may additionally enter a power conserve mode in response to transmitting the detach message in order to reduce signaling overhead and power consumption (e.g., enter sleep mode).

Subsequently, the peripheral device 205, in some examples, may transmit an attach message to the network entity 105. The network entity 105, upon receiving the attach message 235, may update its routing network settings. In some examples, the routing network settings may identify whether communications associated with the UE will be transmitted to either the UE 110 or the peripheral device 205. In one or more examples, the network entity 105 may update the routing network setting to indicate that subsequent packets for the UE should instead be redirected directly to the peripheral devices. Thus, in some aspects, the network entity 105 may begin transmitting packets scheduled for transmission to the IMSI of the UE 110 from the network entity 105 to the peripheral device 205 without routing them via the UE 110 based on the virtual identifier when the peripheral device is attached to the network entity.

Figure 3:
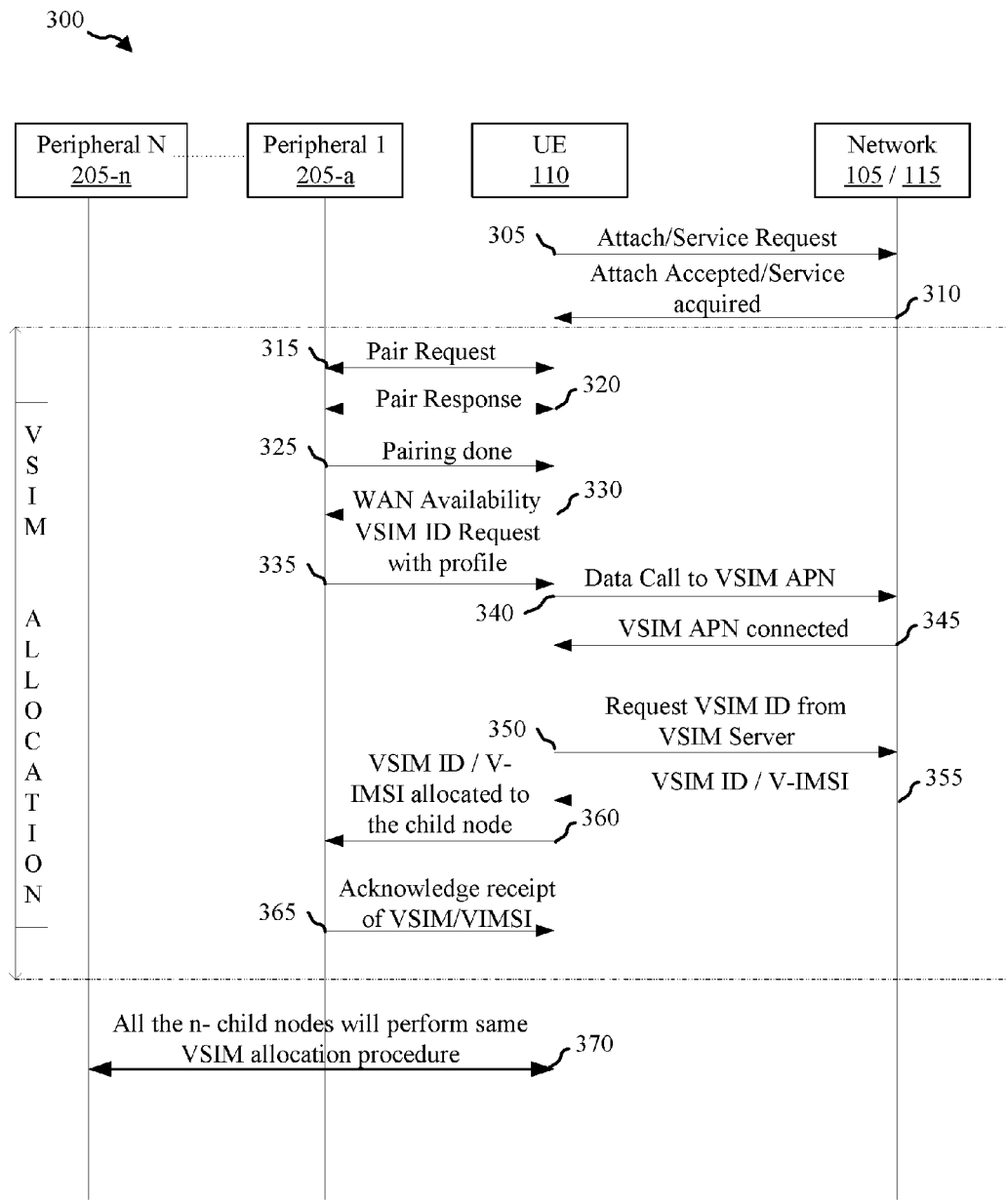
FIG. 3 is a message flow diagram of requesting and allocating a virtual identifier in accordance with an exemplary embodiment of the present disclosure.

FIG. 3 is a flowchart of a method 300 of requesting and allocating the virtual identifier in accordance with an exemplary embodiment of the present disclosure. The flowchart 300 includes a network entity 105, the UE 110, and one or more peripheral devices 205 that may be similar to the network entity 105 (e.g., core network 115 or base station 105), the UE 110, and the peripheral device 205 described with reference to FIGS. 1-2.

The method 300 may include the UE 110, at 305, transmitting an attach request to the network entity 105. The network entity 105 may perform authentication and registration procedures associated with the attach request from the UE 110 and at 310, transmit an attach accepted/service acquired message to the UE 110. Upon completing the registration procedure between the UE 110 and the network entity 105, the UE 110 and the peripheral device 205-*a* may be paired via a pair request at 315 and pair response 320. Although the flowchart illustrates that the peripheral device 205-*a* initiates the pair request, it is contemplated that either device (e.g., UE 110 or peripheral device 205-*a*) may initiate the pairing. Once, at 325, the pairing between the UE 110 and the peripheral device 205-*a* is completed, the UE 110, at 330 may notify the peripheral device 205-*a* of WAN availability.

In some examples, the notification of the WAN availability may prompt the peripheral device 205-*a* to transmit, at 335, a VSIM profile request to the UE 110. The UE 110, at 340, may initiate a data call with the VSIM access point name (APN). Once the data call is connected 345, the UE 110 may transmit a request to the network 105 for a VSIM profile for the peripheral device 205-*a*. At 355, the VSIM server (network entity 105) may allocate a unique VSIM profile for the peripheral device and forward the allocated VSIM profile to the UE 110. In some aspects, after receiving the VSIM profile from the VSIM server, the UE 110 may update its virtual identifier peripheral database that maintains the list of assigned VSIM profiles or virtual identifiers for the one or more peripheral devices 205 associated with the UE 110. The UE 110, at 360 may further allocate the VSIM profile to the peripheral device 205 using non-cellular (e.g., Bluetooth/Wi-Fi) communication link. At 365, the peripheral device 205 may acknowledge the receipt of the VSIM profile to the UE 110. In some aspects, a similar procedure as described above may be performed, at 370 for each of the one or more peripheral devices 205 associated with the UE 110 until each of the peripheral devices 205-N have been assigned their respective unique virtual identifiers that are based on the mobile device ID of the UE 110.

Figure 4:
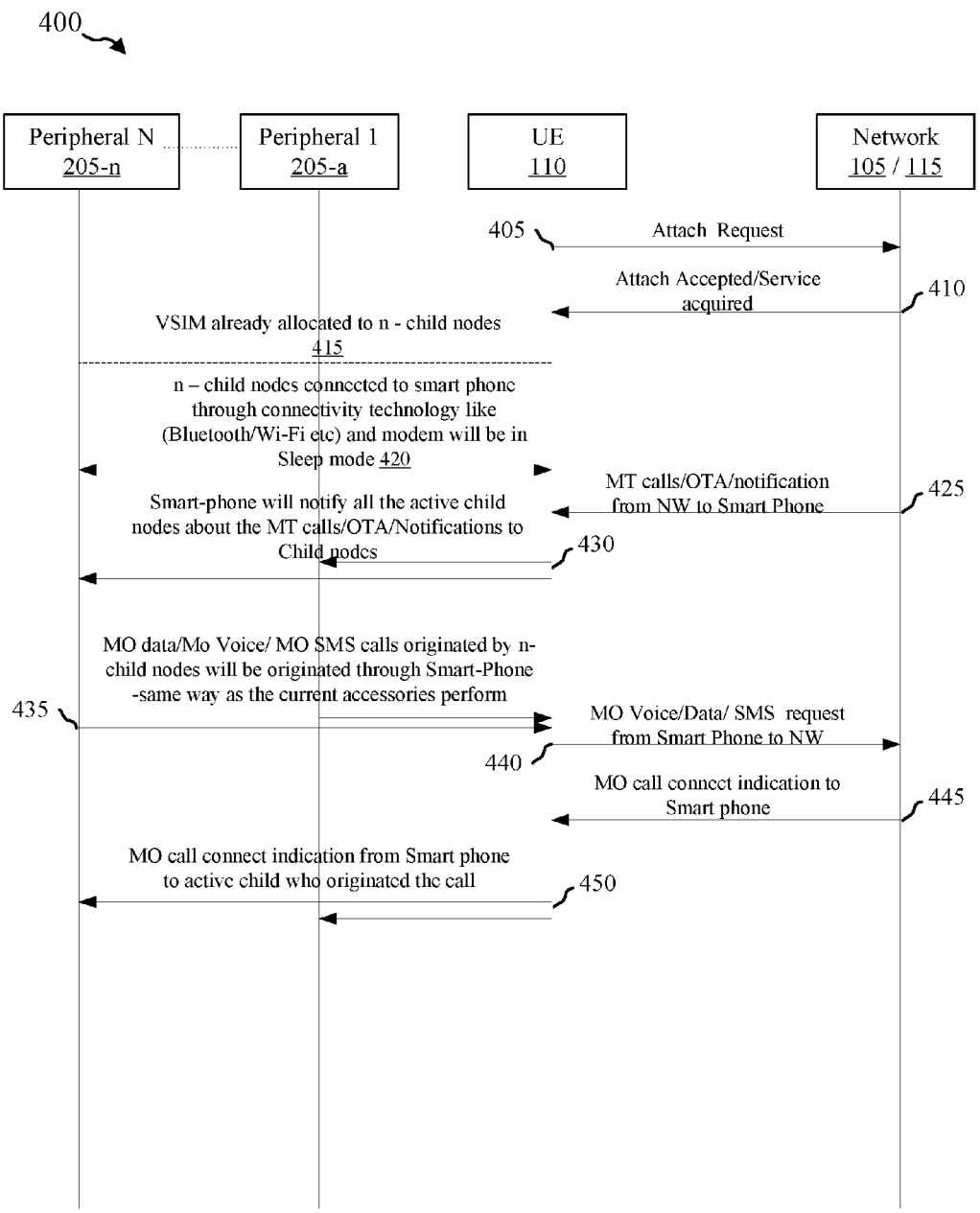
FIG. 4 is a message flow diagram of managing communications between a network, UE, and one or more peripheral devices when the one or more peripheral devices are within an effective range of a short-range communication chip in accordance with an exemplary embodiment of the present disclosure.

FIG. 4 is a flowchart 400 of managing communications between the network, the UE, and the one or more peripheral devices when the one or more peripheral devices may be within the effective range of the short-range communication chip in accordance with an exemplary embodiment of the present disclosure.

In the illustrated example, the UE 110 and the network entity 105 may complete the attach procedures based on the attach request 405 and attach accepted response 410 as described with reference to FIG. 3 above. In some examples, at 415, each of the plurality of peripheral devices 205 may be allocated their respective unique VSIM in accordance with the techniques identified in FIG. 3 above. At 420, the communication between the UE 110 and the one or more peripheral devices 205 may be established via the non-cellular connectivity technology (e.g., Bluetooth/Wi-Fi) such that the cellular radio (cellular modem) for the one or more peripheral devices 205 may be maintained in the sleep mode.

Because only the UE 110 may be active with the network entity 105 during this time period, the network entity 105, at 425, may forward all incoming calls, notifications, and messages directed to the mobile device ID of the UE 110 to the UE 110 itself.

At 430, the UE 110 may notify the one or more peripheral devices 205 of the incoming messages (e.g., by displaying the text message on the smart watch or forwarding the call to the wireless headset). Similarly, at 435, any messages originating from the one or more peripheral devices 205 may be routed to the network 105 via the UE 110. For example, at 435, the one or more peripheral devices 205 may transmit a request to initiate transmission of a voice or data packet to the UE 110. The UE 110, in turn, at 440 may forward the received packet to the network entity 105. At 445, the call connect indication may be sent from the network to the UE 110 and forwarded, at 450, from the UE 110 to the one or more peripheral devices 205.

Figure 5:
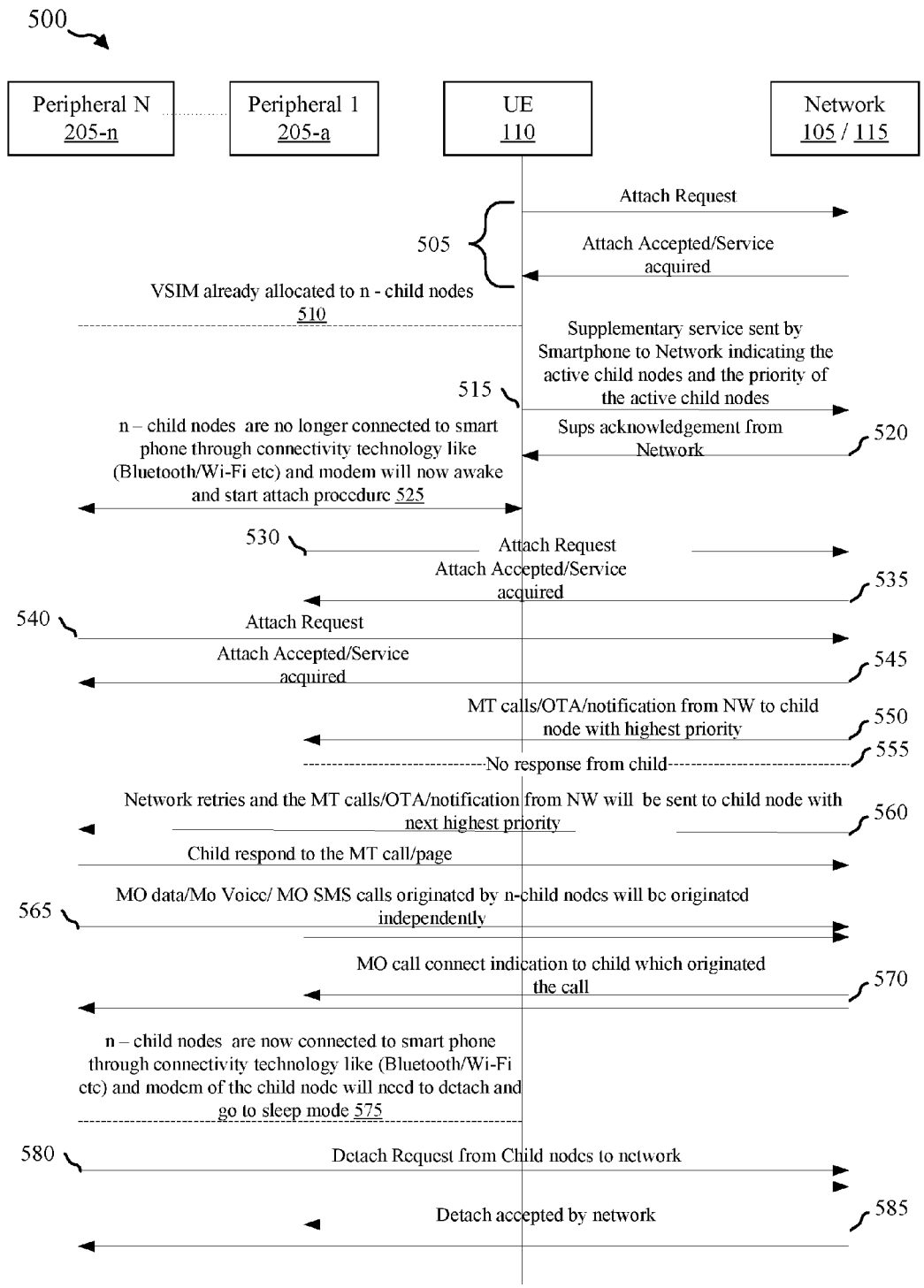
FIG. 5 is a message flow diagram of an example method of managing traffic transfer from the UE to the peripheral devices in accordance with aspects of the present disclosure.

FIG. 5 is a flowchart of an example method 500 of managing traffic when the peripheral device 205 and the UE 110 are no longer connected through non-cellular technology in accordance with aspects of the present disclosure. The method 500 illustrates a network entity 105, the UE 110, and one or more peripheral devise 205 that may be similar to the network entity, UE and the peripheral devices described with reference to FIGS. 1-4.

At 505, the UE and the network may complete the attach procedures as described above with reference to FIGS. 3 and 4. At 510, the one or more peripheral devices may be allocated VSIM profiles in accordance with the steps set forth in FIG. 3. Upon obtaining the virtual identifiers for the one or more peripheral devices associated with the UE 110, the UE 110, at 515, may transmit a supplementary service message to the network 105. In some examples, the supplementary service message may identify the one or more active peripheral devices associated with the UE. Additionally or alternatively, the supplementary service message may further include a priority list of peripheral devices identifying the order in which the network entity should contact the peripheral devices. The list may be generated by the user based on his or her preferences. In some examples, the network entity 105 may update the routing table of IP addresses/VIMSIs of the UE 110 and peripheral devices based on the supplementary service message. At 520, the network may transmit a supplementary service acknowledgment to the UE 110. When, at 525, the peripheral devices 205 and the UE 110 are no longer connected through short-range connectivity (e.g., Bluetooth or Wi-Fi), the cellular modem of the one or more peripheral devices 205 may be activated.

At 530, the one or more peripheral devices may transmit an attach message to the network entity. The network entity, in response, at 535 may update its routing network settings that identifies whether communications associated with the UE will be transmitted to either the UE or the peripheral device. The network entity 105 may also transmit an attach accepted message back to the requesting peripheral device 205-a indicating that the attached procedures were completed. Similarly, at 540, one or more additional peripheral devices 205-N may transmit an attach request to the network entity 105 and the network entity, at 545, in similar fashion may respond with the acknowledgment message.

At 550, when an incoming packet or call is received at the network entity 105 intended for the IMSI of the UE 110, the network entity 105 may refer to the routing table to identify the one or more peripheral devices 205 and their corresponding virtual SIM profiles. The network entity 105 may also initiate transmitting packets from the network entity to the peripheral device without routing them via the UE based on the virtual identifier when the peripheral device is attached to the network entity. In some examples, the network entity 105 may determine which of the plurality of peripheral devices 205 to forward the packets or incoming call based on the priority list received in the supplementary service message from the UE.

If at 535, the highest priority peripheral device 205 fails to respond or accept the transmitted packet (e.g., network entity 105 receiving an acknowledgement of successful transmission), the network entity 105 following a predetermined number of retries may, at 560, attempt to forward the packets to the next highest priority peripheral device 205-N on the priority list. When at 565, the second highest priority peripheral device 205-N, for example, responds, the peripheral device 205-N and network entity 105 may establish communication with the peripheral. Similarly, peripheral devices 205, at 570 and 575 may originate communication (data or voice) with the network entity 105 without the involvement of the UE 110.

However, for example at 580, when the UE 110 and the peripheral devices 205 return to the effective range of the short-range communication technology, the peripheral devices 205, at 585 may detach from the network entity. At 590, the network may acknowledge the detachment and resume communicating with the UE 110 (i.e., forwarding and receiving packets from the UE 110 as oppose to the peripheral devices 205). In such instance, the UE 110 may return from the sleep mode to active mode in order to resume operations. In some examples, the UE 110 returning to proximity of the peripheral device may satisfy one or more second triggers (e.g., an indication that proximate distance between the UE and the peripheral is less than the threshold). As such, the UE 110 may transmit a reattach message to the network entity to initiate re-attachment procedures and resume communication with the network entity.

Figure 6:
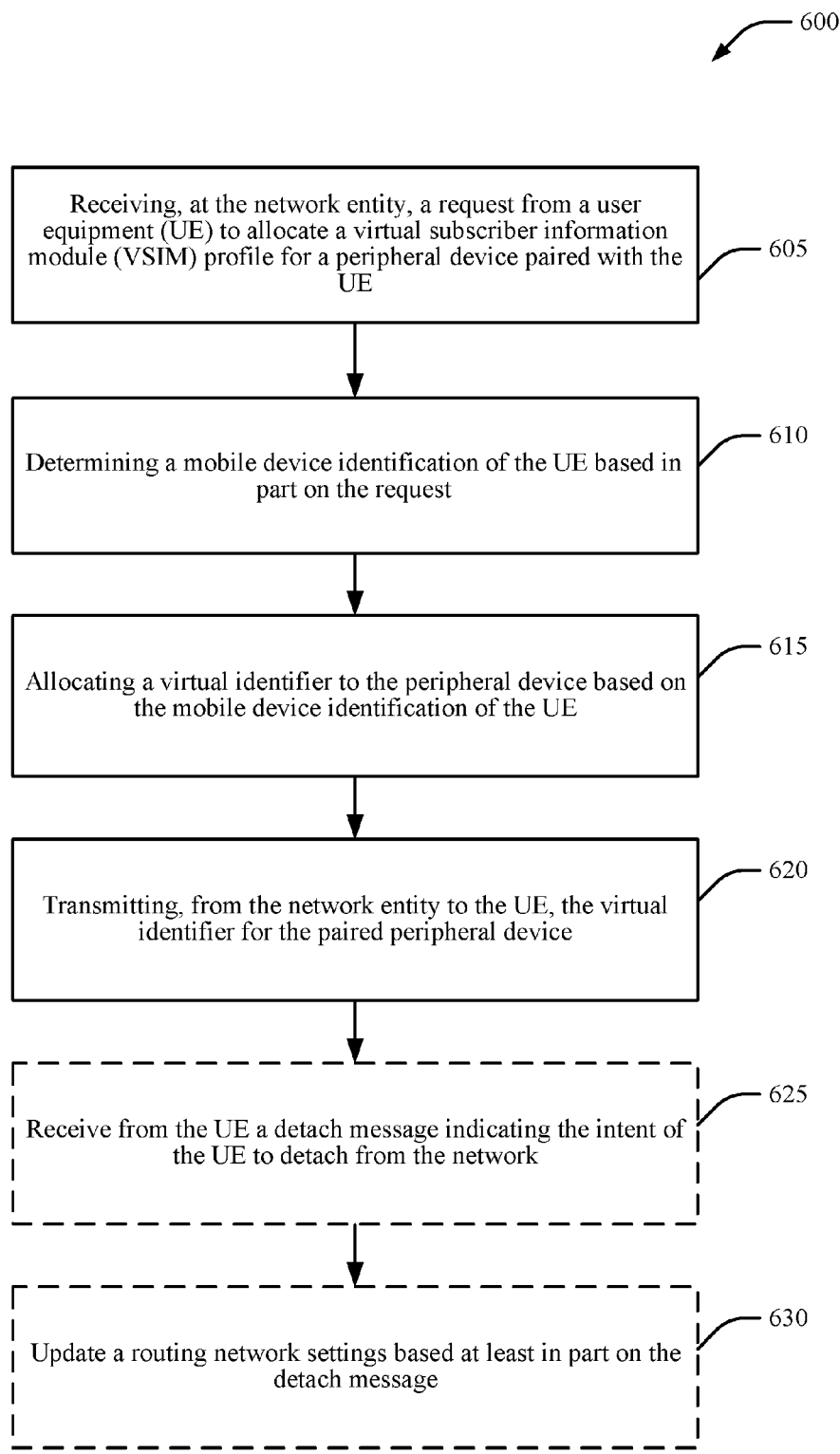
FIG. 6 is a flowchart of an example method implemented by the network entity in allocating virtual identifiers to peripheral devices associated with the UE in accordance with aspects of the present disclosure.

FIG. 6 is a flowchart of an example method 600 in accordance with aspects of the present disclosure. The method 600 may be performed using an apparatus (e.g., the network entity 105 that may be either the core network 115, the VSIM server, or the base station 105, for example). Although the method 600 is described below with respect to the elements of the network entity 105, other components may be used to implement one or more of the steps described herein.

At block 605, the method may include receiving, at the network entity, a request from a user equipment (UE) to allocate a virtual subscriber information module (VSIM) profile for a peripheral device paired with the UE. Aspects of block 605 may be performed by the receiver 806 and the modem 814 described with reference to FIG. 8.

At block 610, the method may include determining a mobile device identification of the UE based in part on the request for VSIM profile. In some examples, the mobile device identification of the UE may be the IMSI associated with the UE 110. Aspects of block 610 may be performed by virtual SIM allocation component 805 described with reference to FIG. 8.

At block 615, the method may include allocating a virtual identifier to the peripheral device based on the mobile device identification of the UE. In some examples, the virtual identifier may be a VSIM profile, VIMSI, or any virtual identifier that may identifiably be correlated with the UE 110. In some examples, the method may further comprise receiving, at the network entity, a supplementary service message from the UE. The supplementary service message may identify a subset of active peripheral devices from a plurality of peripheral devices that are paired with the UE. In some aspects, supplementary service message may further include a priority list of peripheral devices paired with the UE. As such, the network entity may update network routing settings based at least in part on the supplementary service message. Aspects of block 615 may be performed by the VSIM assignment component 810 described with reference to FIG. 8.

At block 620, the method may include transmitting, from the network entity to the UE, the virtual identifier for the one or more paired peripheral device. The method may further include transmitting a supplementary service acknowledgement in response to receiving the supplementary service message from the UE. Aspects of block 620 may be performed by transceiver 802 described with reference to FIG. 8.

At block 625, upon allocating the virtual identifier to one or more peripheral devices and transmitting the information to the UE, the network device may optionally receive from the UE a detach message indicating the intent of the UE to detach from the network. In some examples, the UE may enter a lower power mode or sleep mode. Aspects of block 625 may be performed by the receiver 806 and the modem 814 described with reference to FIG. 8.

At block 630, the network entity may optionally update a routing network settings based at least in part on the detach message. The routing network settings may identify whether communications associated with the UE will be transmitted to either the UE or the peripheral device. Aspects of block 630 may be performed by the network routing component 815 described with reference to FIG. 8.

Figure 7:
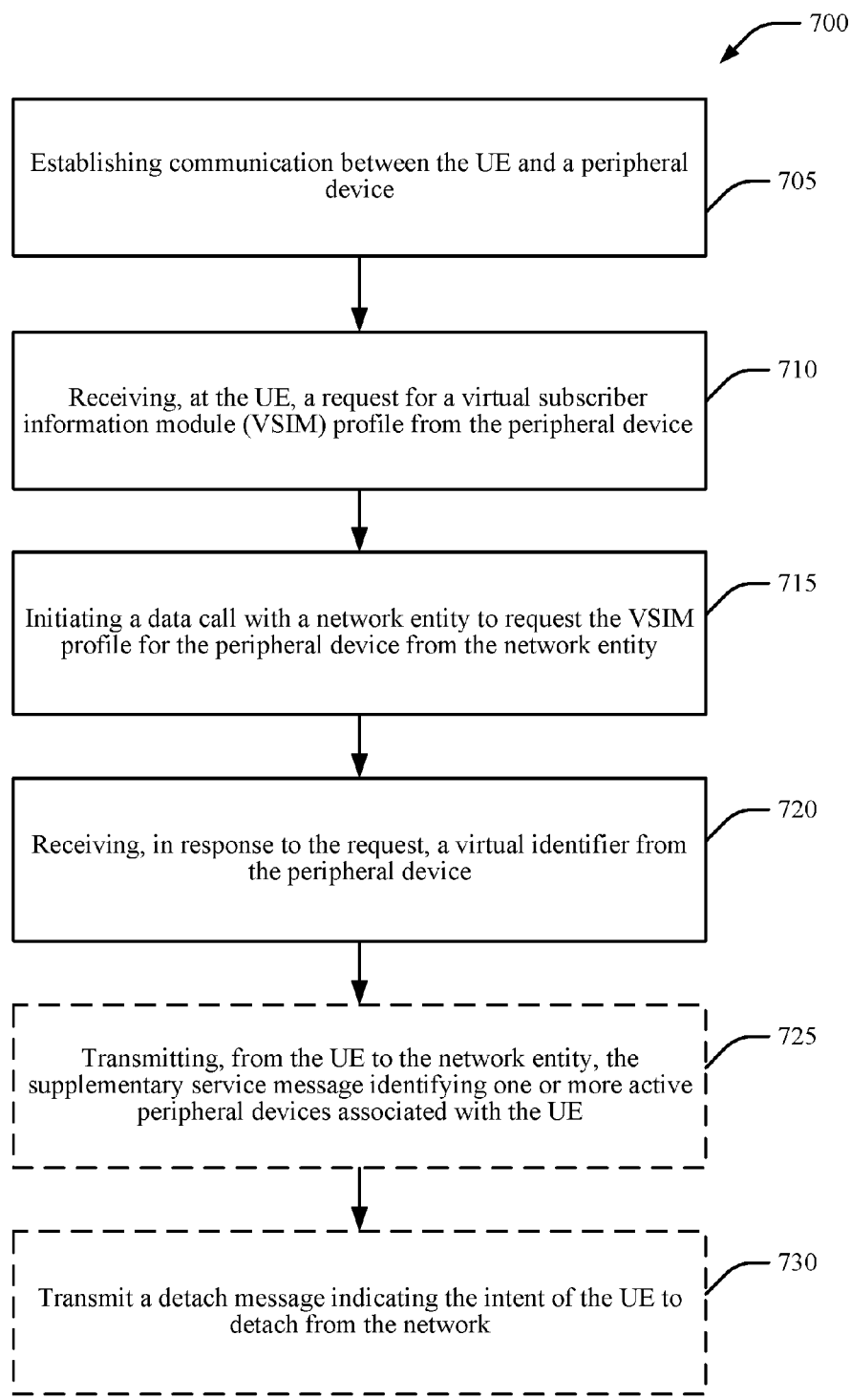
FIG. 7 is a flowchart of an example method implemented by the UE in requesting virtual identifier from the network entity on behalf of the peripheral device in accordance with aspects of the present disclosure.

FIG. 7 is a flowchart of an example method 700 in accordance with aspects of the present disclosure. The method 700 may be performed using an apparatus (e.g., the UE 110, for example). Although the method 700 is described below with respect to the elements of the UE 110, other components may be used to implement one or more of the steps described herein.

At block 705, the method may include establishing communication between the UE and a peripheral device. In some examples, the communication between the UE and the peripheral device may be established via non-cellular short-range communication technology (e.g., Bluetooth or Wi-Fi). Aspects of block 705 may be performed by combination of RF front end 988, transceiver 902 and the modem 914 described with reference to FIG. 9.

At block 710, the method may include receiving, at the UE, a request for a VSIM profile from the peripheral device. In some examples, the VSIM profile request may be received in response to a notification sent from the UE to the peripheral device regarding the availability of WAN. Aspects of block 705 may be performed by receiver 906 described with reference to FIG. 9.

At block 715, the method may further include initiating a data call with a network entity to request the VSIM profile for the peripheral device from the network entity. In some examples, Aspects of block 715 may be performed by peripheral management component 905.

At block 720, the method may include receiving, in response to the request, a virtual identifier from the network entity. In some examples, the UE and the VSIM profile management component 910 may update a virtual identifier peripheral database based on receiving the virtual identifier from the network entity and transmit the allocated virtual identifier to the peripheral device over non-cellular short range communication network. Aspects of block 720 may be performed by receiver 906 described with reference to FIG. 9.

At block 725, the method may optionally also include transmitting, from the UE to the network entity. The supplementary service message may identify one or more active peripheral devices associated with the UE. In some aspects, the supplementary service message further includes a priority list of peripheral devices when a subset of active peripheral devices exceeds a threshold, the priority list identifying an order in which the network entity should contact the peripheral devices. The priority and activation features of the UE may be performed by the priority and activation component 915 described with reference to FIG. 9.

At block 730, the method may determine whether one or more first triggers have been satisfied and transmit a detach message to the network entity indicating an intent to detach from the network. In some examples, the one or more first triggers may include an indication that proximate distance between the UE and the peripheral exceeds a threshold. Upon transmitting the detach message and receiving an acknowledgement from the network entity, the UE 110 may enter a power conserve mode to reduce signaling overhead and conserve power. Aspects of block 730 may be performed by transceiver 902 described with reference to FIG. 9.

Figure 8:
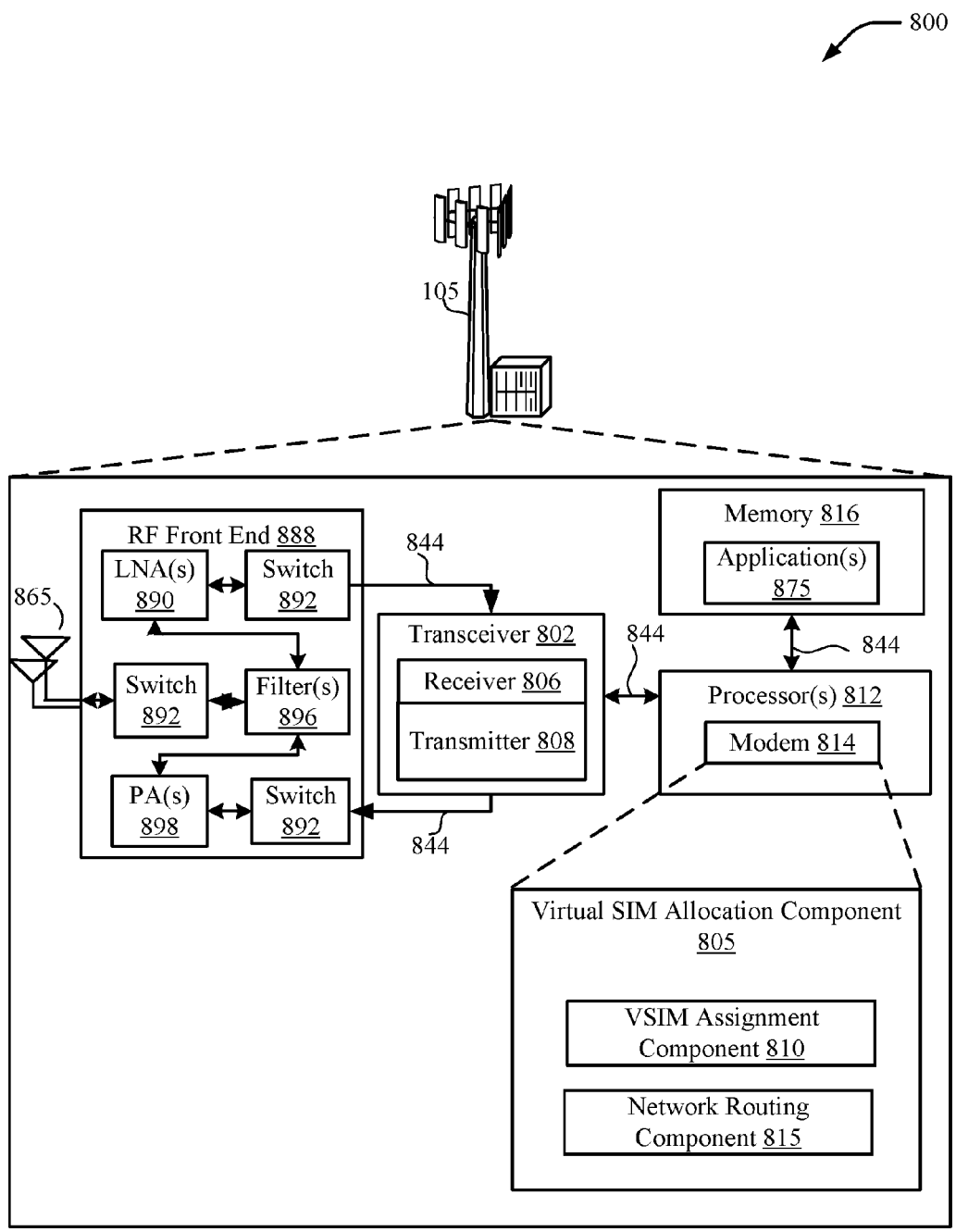
FIG. 8 is a schematic diagram of an aspect of an implementation of various components of the network entity configured for communicating with the network entity, such as the base station in accordance with various aspects of the present disclosure.
Figure 9:
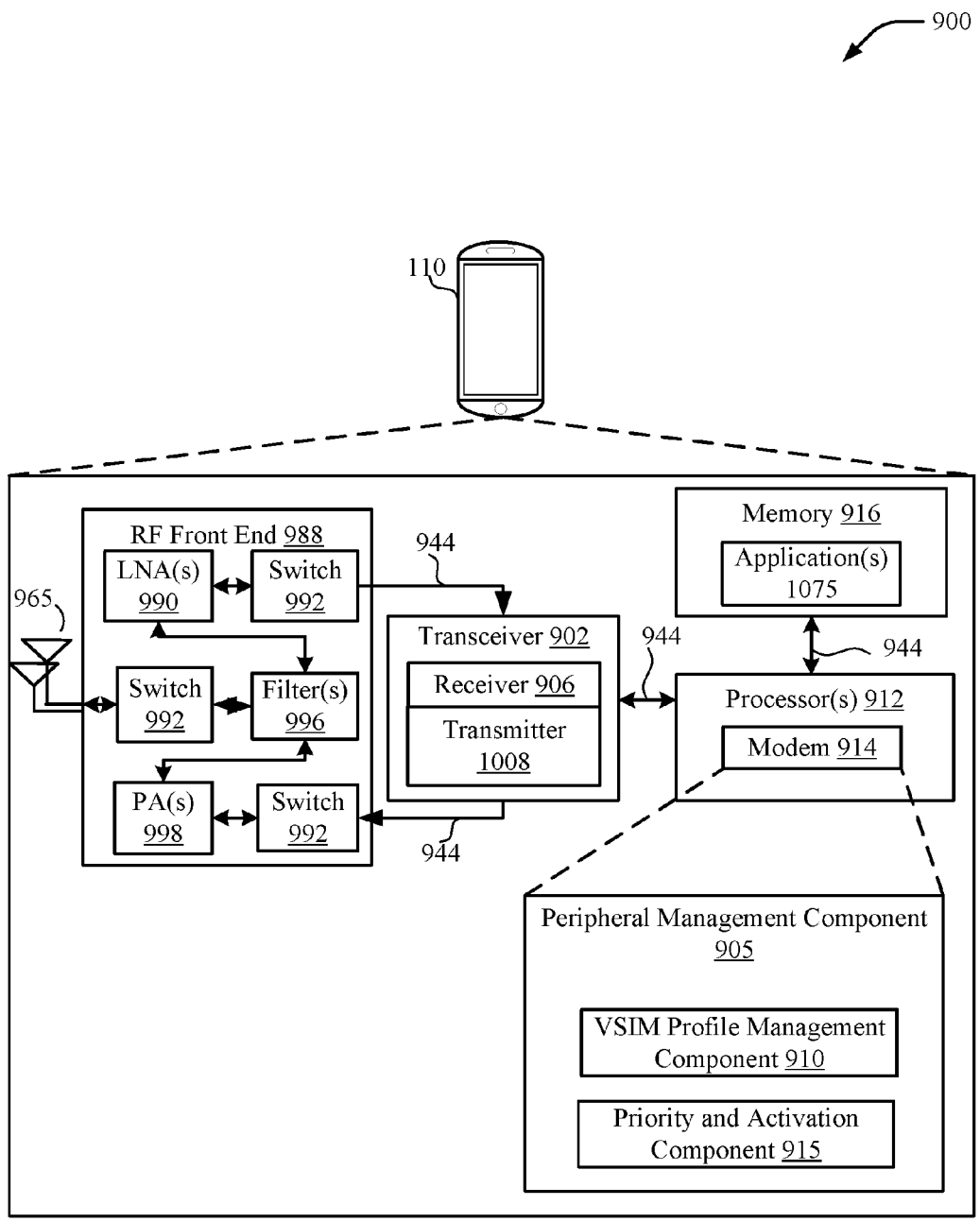
FIG. 9 is a schematic diagram of an aspect of an implementation of various components of the UE configured for communicating with the network entity, such as the base station in accordance with various aspects of the present disclosure.
Figure 10:
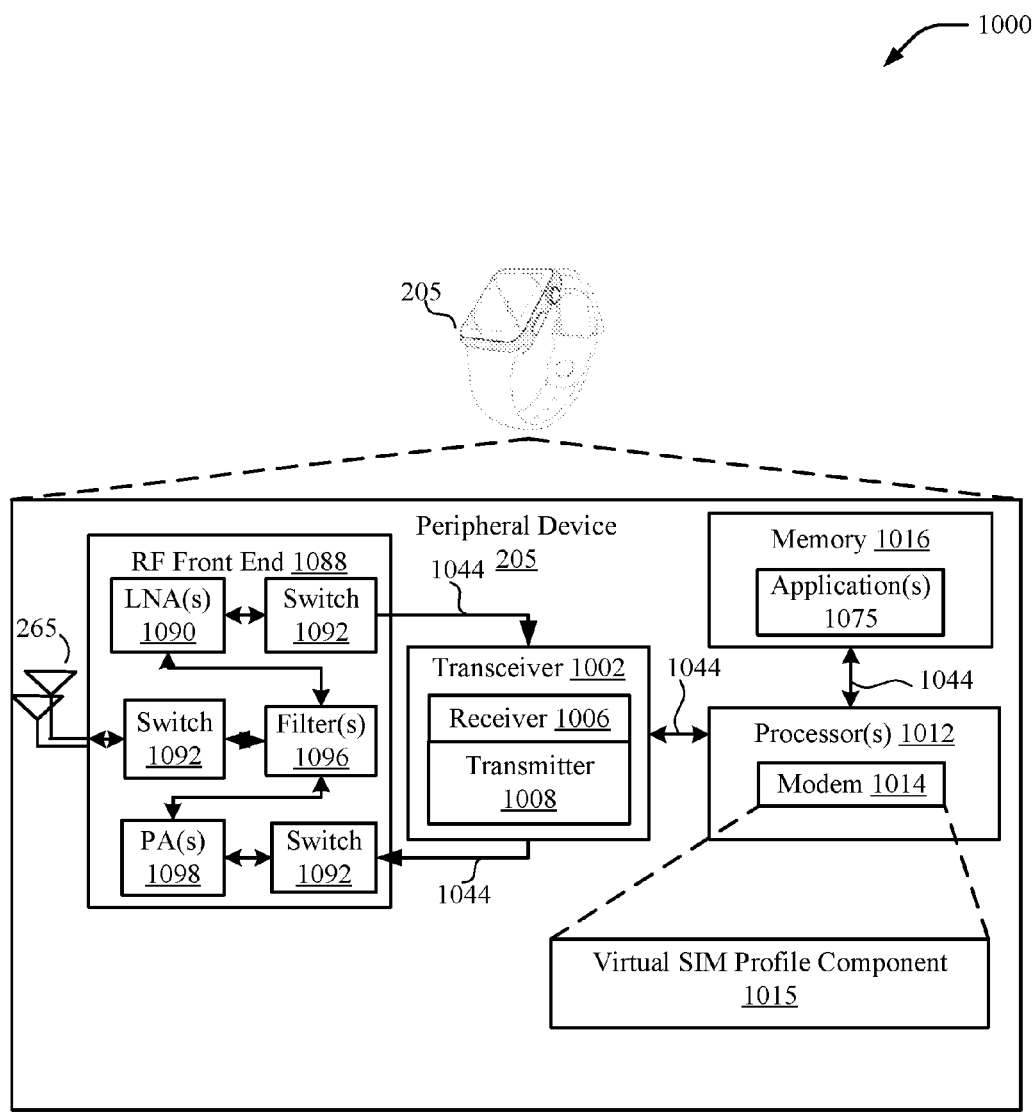
FIG. 10 is a schematic diagram of an aspect of an implementation of various components of the peripheral device configured for communicating with the network entity, such as the base station in accordance with various aspects of the present disclosure.

FIGS. 8-10 describe hardware components and subcomponents of the network entity 105, the UE 110, and the peripheral device 205 for implementing one or more methods described herein in accordance with various aspects of the present disclosure. For sake of brevity, the features that are replicated across each of the devices (e.g., processor, memory, modem, transceiver, and RF front end) may be described with reference to only FIG. 8 and should be understood to perform similar functions in other devices.

First with reference to FIG. 8, one example of an implementation of network entity 105 that may include a variety of components, some of which have already been described above, but including components such as one or more processors 812 and memory 814 and transceiver 802 in communication via one or more buses 844, which may operate in conjunction with virtual SIM allocation component 805 to enable one or more of the functions described herein related to including one or more methods of the present disclosure. The virtual SIM allocation component 805 may further include VSIM assignment component 810 and network routing component 815 for determining whether to route the incoming packets to either the UE or the peripheral devices. Further, the one or more processors 812, modem 814, memory 816, transceiver 802, RF front end 888 and one or more antennas 865, may be configured to support voice and/or data calls (simultaneously or non-simultaneously) in one or more radio access technologies.

In an aspect, the one or more processors 812 can include a modem 814 that uses one or more modem processors. The various functions related to virtual SIM allocation component 805 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with virtual SIM allocation component 805 may be performed by transceiver 802.

Also, memory 814 may be configured to store data used herein and/or local versions of applications or virtual SIM allocation component 805 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining virtual SIM allocation component 805 and/or one or more of its subcomponents, and/or data associated therewith, when network entity 105 is operating at least one processor 812 to execute virtual SIM allocation component 805 and/or one or more of its subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 808 may be, for example, a radio frequency (RF) receiver. In an aspect, receiver 806 may receive signals transmitted by at least one base station 105. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, base station 105 may include RF front end 888, which may operate in communication with one or more antennas 865 and transceiver 802 for receiving and transmitting radio transmissions, for example, wireless communications transmitted by at least one base station 105 or wireless transmissions transmitted by UE 110. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 1088 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 1002 and/or processor 812.

As such, transceiver 812 may be configured to transmit and receive wireless signals through one or more antennas 265 via RF front end 888. In an aspect, transceiver may be tuned to operate at specified frequencies such that base station 105 can communicate with, for example, one or more UEs 115 or one or more cells associated with one or more base stations 105. In an aspect, for example, modem 814 can configure transceiver 802 to operate at a specified frequency and power level based on the base station 105 configuration and the communication protocol used by modem 814.

In an aspect, modem 814 can be a multiband-multimode modem, which can process digital data and communicate with transceiver 802 such that the digital data is sent and received using transceiver 802. In an aspect, modem 814 can be multiband and be configured to support multiple frequency bands for a specific communications protocol. In an aspect, modem 814 can be multimode and be configured to support multiple operating networks and communications protocols. In an aspect, modem 814 can control one or more components of UE 110 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on network configuration information associated with network entity 105 as provided by the network during cell selection and/or cell reselection.

Turning now to FIG. 9, the hardware structure 900 of the UE 110 is described. As noted above, number of components and subcomponents, including the processor, modem, transceiver, RF front end may be similar to those described with reference to FIG. 8. The modem 914 of the UE 110 may further include a peripheral management component 905 that includes a VSIM profile management component 910 that updates the virtual identifier peripheral database based on receiving the virtual identifier from the network entity. The peripheral management component 905 may further include a priority and activation component 915 for managing the priorities of the plurality of peripheral devices when multiple peripheral devices are concurrently active. The peripheral management component 905 may function in conjunction with the processor 912 and/or the modem 914 or as described above be part of the processor itself.

Referring to FIG. 10, the hardware structure 100 of the peripheral device 205 is described. For brevity sake, the duplicate components will not be repeated herein. The peripheral device may be a dual-radio device configured to communicate over short-range communication technology (e.g., Bluetooth and Wi-Fi) as well as cellular modem such that it may establish cellular communication with the network independent of the UE. In some examples, the peripheral device 205 may maintain a virtual SIM profile or virtual identifier that is associated with the mobile device ID of the corresponding UE. In one or more examples, the virtual SIM profile component 1015 of the peripheral device 205 may request a VSIM profile from the UE 110 in response to being notified of WAN availability. The peripheral device may also initiate an attach procedure, when active, with the network to establish communication. The virtual SIM profile component 1015 may be part of the processor 1012 and/or the modem 1014 or may be a separate component that operates in conjunction with the processor.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications implemented at a network entity, comprising:
    receiving, at the network entity, a request from a user equipment (UE) to allocate a virtual subscriber information module (VSIM) profile for a peripheral device paired with the UE;
    determining a mobile device identification of the UE based in part on the request;
    allocating a virtual identifier to the peripheral device based on the mobile device identification of the UE such that the peripheral device and the UE are allocated same phone number;
    transmitting, from the network entity to the UE, the virtual identifier for the paired peripheral device;
    receiving, at the network entity, a supplementary service message from the UE, wherein the supplementary service messages identifies each of active peripheral devices from a plurality of peripheral devices that are paired with the UE;
    updating network routing settings based at least in part on the supplementary service message; and
    transmitting a supplementary service acknowledgement in response to receiving the supplementary service message.

2. The method of claim 1, wherein the supplementary service message further includes a priority list of peripheral devices paired with the UE.

3. The method of claim 1, further comprising:
    receiving, at the network entity, a detach message from the UE; and
    updating a routing network settings based at least in part on the detach message, wherein the routing network settings identifies whether communications associated with the UE will be transmitted to either the UE or the peripheral device.

4. The method of claim 1, further comprising:
    receiving, at the network entity, an attach message from the peripheral device; and
    updating a routing network settings based at least in part on the attach message; and
    transmitting packets from the network entity to the peripheral device without routing them via the UE based on the virtual identifier when the peripheral device is attached to the network entity.

5. The method of claim 4, further comprising:
    receiving, at the network entity, a call initiation request from the peripheral device without involvement of the UE.

6. The method of claim 1, further comprising:
    maintaining a routing table correlating the mobile device identification with respective identifier of the peripheral device.

7. The method of claim 1, wherein the virtual identifier is an virtual international mobile subscriber identity (VIMSI).

8. A method for wireless communications implemented at a user equipment (UE), comprising:
  establishing communication between the UE and a peripheral device;
  receiving, at the UE, a request for a virtual subscriber information module (VSIM) profile from the peripheral device;
  initiating a data call with a network entity to request the VSIM profile for the peripheral device from the network entity such that the peripheral device and the UE are allocated same phone number;
  receiving, in response to the request, a virtual identifier from the network entity; and
  transmitting, from the UE to the network entity, a supplementary service message that identifies one or more active peripheral devices associated with the UE and includes a priority list of peripheral devices when a subset of active peripheral devices exceeds a threshold, the priority list identifying an order in which the network entity should contact the peripheral devices.

9. The method of claim 8, further comprising:
  updating a virtual identifier peripheral database based on receiving the virtual identifier from the network entity; and
  transmitting the allocated virtual identifier to the peripheral device over non-cellular short range communication network.

10. The method of claim 8, further comprising:
  determining that one or more first triggers have been satisfied, wherein the one or more first triggers include indication that proximate distance between the UE and the peripheral exceeds a threshold;
  transmitting a detach message to the network entity indicating an intent to detach from the network based on the determination; and
  entering a power conserve mode in response to transmitting the detach message.

11. The method of claim 10, further comprising:
  determining that one or more second triggers have been satisfied, wherein the one or more second triggers include indication that proximate distance between the UE and the peripheral is less than the threshold; and
  transmitting a reattach message to the network entity, wherein the UE resumes communication with the network entity based on completion of reattach procedure.

12. The method of claim 11, wherein the UE resumes communicating with the peripheral device via non-cellular short range technology, and wherein the peripheral device, in response to determination that the one or more second triggers have been satisfied, detaches from the network entity and turns off its cellular modem.

13. The method of claim 8, wherein the virtual identifier is an virtual international mobile subscriber identity (VIMSI).

14. An apparatus for wireless communications implemented at a network entity, comprising:
  a processor; and
  a memory coupled to the processor, wherein the memory includes instructions executable by the processor to:
    receive, at the network entity, a request from a user equipment (UE) to allocate a virtual subscriber information module (VSIM) profile for a peripheral device paired with the UE;
    determine a mobile device identification of the UE based in part on the request;
    allocate a virtual identifier to the peripheral device based on the mobile device identification of the UE such that the peripheral device and the UE are allocated same phone number;
    transmit, from the network entity to the UE, the virtual identifier for the paired peripheral device;
    receive, at the network entity, a supplementary service message from the UE, wherein the supplementary service messages identifies each of active peripheral devices from a plurality of peripheral devices that are paired with the UE;
    update network routing settings based at least in part on the supplementary service message; and
    transmit a supplementary service acknowledgement in response to receiving the supplementary service message.

15. The apparatus of claim 14, wherein the supplementary service message further includes a priority list of peripheral devices paired with the UE.

16. The apparatus of claim 14, wherein the instructions are further executable to:
  receive, at the network entity, a detach message from the UE; and
  update a routing network settings based at least in part on the detach message, wherein the routing network settings identifies whether communications associated with the UE will be transmitted to either the UE or the peripheral device.

17. The apparatus of claim 14, wherein the instructions are further executable to:
  receive, at the network entity, an attach message from the peripheral device; and
  update a routing network settings based at least in part on the attach message; and
  transmit packets from the network entity to the peripheral device without routing them via the UE based on the virtual identifier when the peripheral device is attached to the network entity.

18. The apparatus of claim 17, wherein the instructions are further executable to:
  receive, at the network entity, a call initiation request from the peripheral device without involvement of the UE.

19. The apparatus of claim 14, wherein the instructions are further executable to:
  maintain a routing table correlating the mobile device identification with respective identifier of the peripheral device.

20. The apparatus of claim 14, wherein the virtual identifier is an virtual international mobile subscriber identity (VIMSI).

21. A user equipment (UE) for wireless communications, comprising:
  a processor; and
  a memory coupled to the processor, wherein the memory includes instructions executable by the processor to:
    establish communication between the UE and a peripheral device;
    receive, at the UE, a request for a virtual subscriber information module (VSIM) profile from the peripheral device;
    initiate a data call with a network entity to request the VSIM profile for the peripheral device from the network entity such that the peripheral device and the UE are allocated same phone number;
    receive, in response to the request, a virtual identifier from the network entity; and transmit, from the UE to the network entity, a supplementary service message that identifies one or more active peripheral devices associated with the UE and includes a priority list of peripheral devices when a subset of active peripheral devices exceeds a threshold, the priority list identifying an order in which the network entity should contact the peripheral devices.

22. The UE of claim 21, wherein the instructions are further executable by the processor to:
update a virtual identifier peripheral database based on receiving the virtual identifier from the network entity; and
transmit the allocated virtual identifier to the peripheral device over non-cellular short range communication network.

23. The UE of claim 21, wherein the instructions are further executable by the processor to:
determine that one or more first triggers have been satisfied, wherein the one or more first triggers include indication that proximate distance between the UE and the peripheral exceeds a threshold;
transmit a detach message to the network entity indicating an intent to detach from the network based on the determination; and
enter a power conserve mode in response to transmitting the detach message.

24. The UE of claim 21, wherein the instructions are further executable by the processor to:
determine that one or more second triggers have been satisfied, wherein the one or more second triggers include indication that proximate distance between the UE and the peripheral is less than the threshold; and
transmit a reattach message to the network entity, wherein the UE resumes communication with the network entity based on completion of reattach procedure.

25. The UE of claim 24, wherein the UE resumes communicating with the peripheral device via non-cellular short range technology, and wherein the peripheral device, in response to determination that the one or more second triggers have been satisfied, detaches from the network entity and turns off its cellular modem.

26. The UE of claim 21, wherein the virtual identifier is an virtual international mobile subscriber identity (VIMSI).

27. An apparatus for wireless communications implemented at a network entity, comprising:
means for receiving, at the network entity, a request from a user equipment (UE) to allocate a virtual subscriber information module (VSIM) profile for a peripheral device paired with the UE;
means for determining a mobile device identification of the UE based in part on the request;
means for allocating a virtual identifier to the peripheral device based on the mobile device identification of the UE such that the peripheral device and the UE are allocated same phone number;
means for transmitting, from the network entity to the UE, the virtual identifier for the paired peripheral device;
means for receiving, at the network entity, a supplementary service message from the UE, wherein the supplementary service messages identifies each of active peripheral devices from a plurality of peripheral devices that are paired with the UE and includes a priority list of peripheral devices paired with the UE; and
means for updating network routing settings based at least in part on the supplementary service message; and means for transmitting a supplementary service acknowledgement in response to receiving the supplementary service message.

28. An apparatus for wireless communications implemented at a user equipment (UE), comprising:
means for establishing communication between the UE and a peripheral device;
means for receiving, at the UE, a request for a virtual subscriber information module (VSIM) profile from the peripheral device;
means for initiating a data call with a network entity to request the VSIM profile for the peripheral device from the network entity such that the peripheral device and the UE are allocated same phone number;
means for receiving, in response to the request, a virtual identifier from the network entity; and
means for transmitting, from the UE to the network entity, a supplementary service message that identifies one or more active peripheral devices associated with the UE and includes a priority list of peripheral devices when a subset of active peripheral devices exceeds a threshold, the priority list identifying an order in which the network entity should contact the peripheral devices.

29. A non-transitory computer readable medium for wireless communications implemented at a network entity, comprising:
code for receiving, at the network entity, a request from a user equipment (UE) to allocate a virtual subscriber information module (VSIM) profile for a peripheral device paired with the UE;
code for determining a mobile device identification of the UE based in part on the request;
code for allocating a virtual identifier to the peripheral device based on the mobile device identification of the UE such that the peripheral device and the UE are allocated same phone number;
code for transmitting, from the network entity to the UE, the virtual identifier for the paired peripheral device;
code for receiving, at the network entity, a supplementary service message from the UE, wherein the supplementary service messages identifies each of active peripheral devices from a plurality of peripheral devices that are paired with the UE and includes a priority list of peripheral devices paired with the UE; and
code for updating network routing settings based at least in part on the supplementary service message; and
code for transmitting a supplementary service acknowledgement in response to receiving the supplementary service message.

30. A non-transitory computer readable medium for wireless communications implemented at a user equipment (UE), comprising:
code for establishing communication between the UE and a peripheral device;
code for receiving, at the UE, a request for a virtual subscriber information module (VSIM) profile from the peripheral device;
code for initiating a data call with a network entity to request the VSIM profile for the peripheral device from the network entity such that the peripheral device and the UE are allocated same phone number;
code for receiving, in response to the request, a virtual identifier from the network entity; and
code for transmitting, from the UE to the network entity, a supplementary service message that identifies one or more active peripheral devices associated with the UE and includes a priority list of peripheral devices when a subset of active peripheral devices exceeds a threshold, the priority list identifying an order in which the network entity should contact the peripheral devices.

* * * * *